Figure 1:
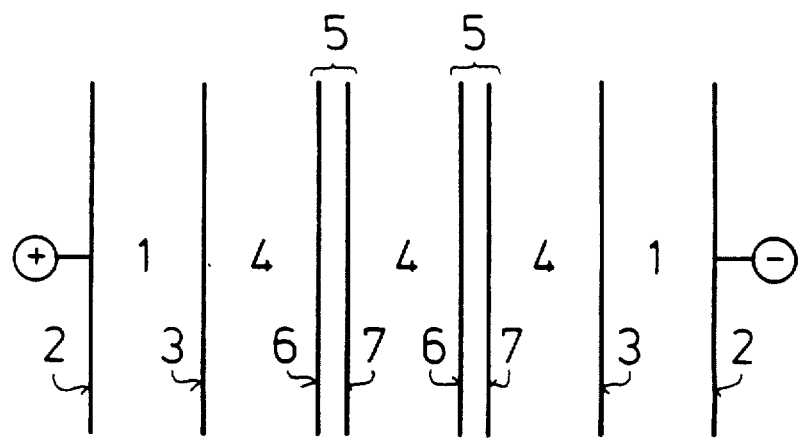

United States Patent [19]

Mueller et al.

[11] Patent Number: 4,670,125

[45] Date of Patent: Jun. 2, 1987

[54] PRODUCTION OF BIPOLAR MEMBRANES

[75] Inventors: Hans Mueller, Ludwigshafen; Hermann Puetter, Neustadt, both of Fed. Rep. of Germany

[73] Assignee: BASF Aktiengesellschaft, Ludwigshafen, Fed. Rep. of Germany

[21] Appl. No.: 833,911

[22] Filed: Feb. 26, 1986

[30] Foreign Application Priority Data

Mar. 8, 1985 [DE] Fed. Rep. of Germany ....... 3508206

[51] Int. Cl.$^4$ .......................... C25B 13/08; C09J 5/02
[52] U.S. Cl. .................................. 204/296; 156/308.6; 156/334; 204/182.4
[58] Field of Search ............................ 156/308.6, 334; 204/182.4, 296

[56] References Cited

U.S. PATENT DOCUMENTS

| 2,829,095 | 4/1958 | Oda et al. | |
|---|---|---|---|
| 3,562,139 | 2/1971 | Leitz | 204/296 |
| 4,024,043 | 5/1977 | Dege et al. | 204/296 |
| 4,057,481 | 11/1977 | Lee et al. | 204/296 |
| 4,116,889 | 9/1978 | Chlanda et al. | 204/182.4 |
| 4,253,900 | 3/1981 | Dege et al. | 204/182.4 |
| 4,311,771 | 1/1982 | Walther | 204/182.4 |

FOREIGN PATENT DOCUMENTS 1038777  8/1966  United Kingdom .

OTHER PUBLICATIONS

Israel Journal of Chemistry, 9 (1971), 485.

Primary Examiner—John F. Niebling
Assistant Examiner—Terryence Chapman
Attorney, Agent, or Firm—John H. Shurtleff

[57] ABSTRACT

A bipolar membrane is produced by fastening an anion exchange membrane to a cation exchange membrane with the aid of an ion-permeable adhesive, by a process in which an aqueous solution of a polyvinylamine is used as the adhesive, and the bipolar membrane, which consists of two ion exchange membranes and the film-like adhesive, is subjected to electrodialysis.

9 Claims, No Drawings

PRODUCTION OF BIPOLAR MEMBRANES

The present invention relates to a process for the production of bipolar membranes by fastening an anion exchange membrane to a cation exchange membrane with the aid of an adhesive consisting of polyvinylamine.

Bipolar membranes which are used, for example, for isolating acids or bases from their salts by electrodialysis are ion exchange membranes having fixed cations on one side and corresponding anions on the other side. Bipolar membranes are produced, for example, by firmly anchoring cationic or anionic groups to both sides of a neutral membrane by means of a chemical treatment (U.S. Pat. No. 4,057,481) or bringing an anion exchange membrane into close contact with a cation exchange membrane, for example by pressing the membranes on top of one another in the presence of heat (British Pat. No. 1,038,777). Attempts have been made to increase the stability of such bipolar membranes, obtained by combining anion exchange membranes with cation exchange membranes, by applying an ion-perm able adhesive between the two membranes. A polymerizable mixture of polyethyleneimine and epichlorohydrin (U.S. Pat. No. 2,829,095) or polyvinyl chloride and polyvinyl alcohol (Israel Journal of Chemistry, 9 (1971), 485) has been proposed as an adhesive.

Bipolar membranes are difficult to produce by the conventional methods. For example, in a chemical treatment of the surface, the two layers have to be of uniform thickness and must be in contact with one another over the entire surface in order to ensure the current flow. On the other hand, the layers must not penetrate one another since the membrane would then lose its bipolar selectivity. Although combining two monopolar membranes gives bipolar membranes possessing defined anionic and cationic layers, this method gives rise to difficulties at the contact surface. If the membranes are not completely in contact, the resistance increases. The same applies where the adhesive is not sufficiently conductive. Moreover, very undesirable tears or bubbles may form at the points of contact in bipolar membranes of the stated type under the operating conditions.

Bipolar membranes which consist of the two individual membranes and polyvinyl alcohol as an adhesive are prepared according to Ber. Bunsenges. Phys. Chem. 68 (1964), 536, by a method in which the cation exchange films and the anion exchange films are coated with a polyvinyl alcohol solution, the films are laid on top of the other and heated for one hour at 60° C., and the bipolar membrane is then dried, and compressed for 30 minutes at 100° C. Although the resulting bipolar membranes exhibit firm adhesion, their swellability in aqueous salt solutions is irreversibly restricted, and these bipolar membranes, which possess rectifying properties, are therefore unsuitable for electrodialysis.

We have found that bipolar membranes suitable for electrodialysis are obtained from an anion exchange membrane, a cation exchange membrane and an ion-permeable adhesive if an aqueous solution of a polyvinylamine is used as the adhesive, and the bipolar membrane consisting of the two ion exchange membranes and the film-like adhesive is subjected to electrodialysis.

The bipolar membranes can be produced using conventional ion exhcnage membranes, as described in, for example, K. S. Spiegler, Principles of Desalination, Acad. Press. New York, 1980, page 269. Membranes of this type are produced by, for example, copolymerization of styrene and divinylbenzene or butadiene, or of acrylonitrile and butadiene, the cations being attached firmly to the membrane by, for example, sulfochlorination, and the anions by chloromethylation and reaction with tertiary amines. The membranes are, for example, from 0.1 to 1 mm thick.

The adhesive used is an aqueous polyvinylamine solution, an example of a suitable polyvinylamine being one in which the amino group may be substituted by alkyl of 1 to 4 carbon atoms and which has a molecular weight of from $10^4$ to $10^6$. For example, from 0.5 to 70, preferably from 3 to 15%, strength aqueous solutions of polyvinylamine are used. Solutions of the stated type are obtained, for example, by a conventional method, by acidic or alkaline hydrolysis of polyvinylformamide or of polyvinylacetamide with sodium hydroxide solution or hydrochloric acid. Aqueous solutions which are obtained by hydrolyzing polyvinylformamide with hydrochloric acid by a method in which, for example, a 1–50, preferably 5–20%, strength aqueous polyvinylformamide solution is treated with hydrochloric acid at from 60° to 100° C. are particularly useful. The polyvinylamine solutions are still liquid and can be easily applied onto the membranes.

The polyvinylamine solution is applied onto the membranes by brushing on or roller-coating, for example at from 10° to 50° C., adequate adhesion being achieved, for example, even when the adhesive is applied to only one of the two membranes. It is also possible to impregnate the membranes on both sides with the solution. The outer membrane surface is washed free of the adhesive during finishing of the bipolar membrane. The adhesive layer is, for example, from 0.001 to 0.05 mm thick.

Figure 3:
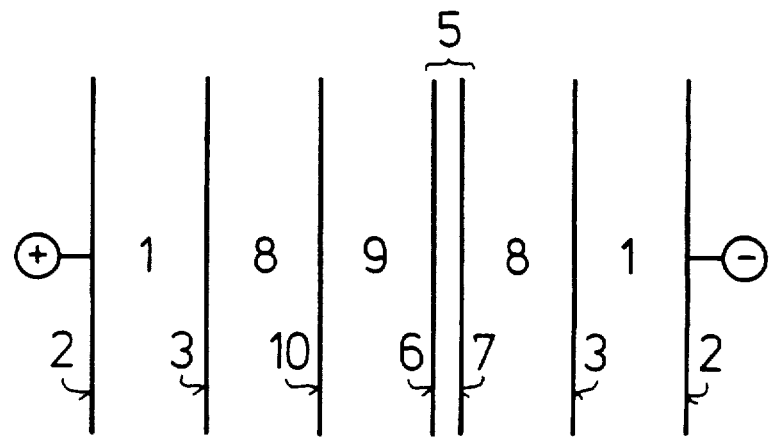

The bipolar membrane produced in this manner and consisting of the two ion exchange membranes and the film-like adhesive is strengthened by an electrodialysis treatment. The electrodialysis is carried out, for example, using a current of from 0.1 to 10, preferably from 0.5 to 5, A/dm$^2$ for from 5 to 50, preferably from 10 to 40, hours at from 10° to 80° C., preferably from 20° to 40° C. The specific procedure is as follows: the preprepared pair of membranes is incorporated into the electrodialysis cell so that the cation exchange membrane faces the cathode, and the anion exchanger faces the anode. For example, an electrodialysis cell as required when the bipolar membrane is subsequently used and as illustrated in FIG. 3 can be employed. However, the membranes may also be subjected to the electrodialysis after-treatment in a separate unit, as illustrated in, for example, FIG. 1. A suitable electrolyte for the treatment of the membranes is an aqueous salt solution having a salt content of from 0.1 to 5, preferably from 0.5 to 2, moles/l. Examples of suitable salt solutions are sodium chloride, sodium acetate and sodium hydroxide solutions, but other water-soluble salts, bases or acids may also be used. The electrodialysis causes the membranes to adhere firmly to one another. After this treatment, they can no longer be separated from one another without being destroyed.

The bipolar membranes obtainable by the novel process are resilient. Electrodialysis converts them to a form which would have been adopted by the individual membranes under the same conditions. Frequently the membranes have a slightly wavy shape; the anion exchange membrane and cation exchange membrane have matched up with one another in shape, without either of the two membranes exhibiting tears. The bipolar membranes have just as long a shelf life as their individual components and are generally stored in aqueous sodium chloride solution.

The bipolar membranes according to the invention are particularly useful for electrodialysis processes. It is surprising that the membranes connected to one another by the process of the inention are adhesively bonded to one another uniformly and irreversibly by the electrodialysis after-treatment. Moreover, it was expected that the adhesive strengthened in this manner would hinder the current transport and water transport within the double membrane. Surprisingly, the bipolar membranes have proven resilient and completely usable even after prolonged use.

Because of these advantageous properties, the bipolar membranes are very useful, for example, for cleaving salts back into acids and bases by electrodialysis, as described in, for example, J. Membrane Science, 2 (1977), 109–124. In particular, they are very useful for converting aqueous solutions of salts of organic compounds to aqueous solutions of the free bases or acids from which the salts of the organic compounds are derived. Examples of starting material sfor this electrodialysis are salts of organic acids, such as carboxylic acids, hydroxycarboxylic acids or amino acids, phenols or salts of organic bases, such as amines or heterocycles, and betaines and quaternary ammonium compounds. The permeability to the organic ions of this type is very low, so that the electrodialysis takes place with high yields of materials and high selectivities. For example, from 0.1 to 10 molar aqueous solutions of the bases or acids are obtained in this electrodialysis.

EXAMPLE 1

(a) The adhesive used was 5% strength by weight aqeuous polyvinylamine solution (K value 139) which is obtained by hydrolyzing polyvinylformamide with hydrochloric acid for 6 hours at 70° C., using 1.22 moles of HCL pre kg of polyvinylformamide.

(b) The adhesive was applied onto five cation exchange membranes available commercially under the name Neosepta ® CH-45t and five anion exchange membranes available commercially under the name Neosepta ® ACH-45T, a thin coat being applied on one side of each membrane by roller coating. The membranes were laid one on top of the other with the adhesive-coated side and were scraped smooth. 5 bipolar membranes consisting of 5 cation exchange membranes and 5 anion exchange membranes available commercially under the anmes Selemion ® CMV and Selemion ® AMV were produced in the same manner.

(c) The prepared bipolar membranes obtained as described in paragraph b) were incorporated, without further treatment, in an electrodialysis apparatus as shown schematically in FIG. 1. The apparatus contained two electrolyte compartments (1) with two platinum electrodes (2) and two cation exchange membranes (3) available commercially under the name Nafion ®. In the other compartments (4), which are separated from the electrolyte compartments (1) by the cation exchange membranes (3), the 10 bipolar membranes (5) produced according to the invention were mounted, the polyamine solution being present between the ion exchange membranes (6 and 7). In the bipolar membranes, the anion exchange membrane (6) faced the anode and the cation exchange membrane (7) faced the cathode. The individual bipolar membranes (5) were arranged separately from one another and fixed by PVC frames. The frames and membranes formed the electrolyte compartments, and the colution flowed through inlets in the frames. The same solution was passed through all inner compartments (4). The unit has the structure of an electrodialysis unit, except that the diluate and concentrate were identical.

(d) 1500 parts of a 5% strength aqueous sodium sulfate solution were passed through the electrolyte compartments (1) to bathe the electrodes (2). A 5% strength aqueous sodium chloride solution was passed through the compartments (4) to bathe the bipolar membranes (5) to be adhesively bonded. Both solutions were circulated. The electrodialysis was carried out at room temperature and at a current density of 0.75 A/dm$^2$ and was terminated after 38 hours. After this electrodialysis treatment, the bipolar membranes were found to be firmly bonded to one another and were resilient and had a slightly wavy shape.

(e) Two pairs of membranes obtained as described in paragraph (b) were stored for 38 hours in a 5% strength aqueous sodium chloride solution but not subjected to electrodialysis. After this treatment, the membranes could readily be separated from one another. No adhesive bonding had taken place.

EXAMPLE 2

Figure 2:
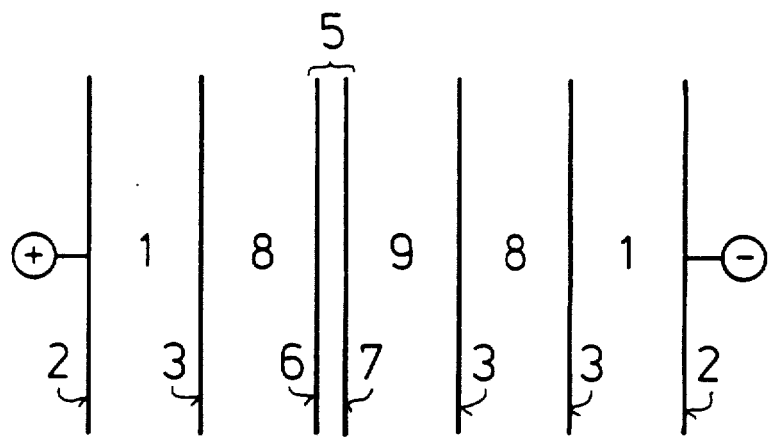

A bipolar membrane produced from the Selemion ® membranes as described in Example 1, paragraph (b), was incorporated in an electrodialysis apparatus which is shown schematically in FIG. 2. This apparatus differed fromthe electrodialysis apparatus described in FIG. 1 in that it contained only one bipolar membrane (5) and two compartments (8 and 9) separated from one another.

The electrolyte compartments (1) were flushed with 1500 parts of 5% strength aqueous sodium sulfate solution as described in Example 1, paragraph (d). Compartment (8) as well as compartment (9) was flushed separately with 1500 parts of a 10% strength aqueous sodium acetate solution.

Electrodialysis was carried out for 20 hours at room temperature and at a current density of 3 A/dm$^2$. The result was that 1395 parts of an aqueous acetic acid (0.86 mole/kg), corresponding to a current efficiency of 54%, were obtained in compartment (9), and 1694 parts of an aqeuous solution containing 0.60 mole of NaOH per kg (corresponding to a current efficiency of 45%) and 1.06 moles of sodium acetate per kg, were obtained in compartment (8).

EXAMPLE 3

The procedure described in Example 2 was followd, compartment (9) being charged with 100 parts of a 1 molar aqueous solution of sodium sarcosine and comaprtment (8) with 1000 parts of an aqueous solution containing 0.5 mole of sodium acetate and 0.5 mole of acetic acid. The current density decreased from 3 A/dm$^2$ to 0.7 A/dm$^2$ after an experimental time of 12 hours. The result was that 900 parts of an aqueous sarcosine solution (1.04 moles/kg, corresponding to a current efficiency of 93% and a material yield of 95%) were obtained in compartment (9), and 1207 parts of an aqeuous sodium acetate solution (1.57 moles/kg) were obtained in compartment (8).

EXAMPLE 4

Experiment 2 was repeated in order to test the barrier action of the bipolar membranes against $Na^{\oplus}$. The experiment lasted for 11 hours and the current efficiency was 95%. The sodium content in compartment (9) decreased from 2.30% to 0.02%, and that in compartment (8) increased from 2.30% to 3.70%. Accordingly, the membrane had a barrier action of >95% up to a concentration difference corresponding to a factor >150.

EXAMPLE 5

Electrodialysis was carried out similarly to Example 2, using 1000 parts of a one-molar aqueous trisodium citrate solution in compartment (9) and 1000 parts of 0.1 molar sodium hydroxide solution in compartment (8). 940 parts of an aqeuous solution of citric acid (1.0 mole/kg, corresponding to a material yield of 94% and a current efficiency of 92%) were obtained in compartment (9), and 1264 parts of sodium hydroxide solution (1.72 moles of NaOH per kg, corresponding to a material yield of 69%) were obtained in compartment (8).

The bipolar membrane was in use for a total of about 100 hours, in general a pH of <7 prevailing on the cation exchange side and a pH of >12 prevailing on the anion exchange side. The abovementioned yields were also obtained at the end of this period. Although the membrane had assumed a slightly dark color, it showed no other change compared with its initial state.

EXAMPLE 6

The apparatus described in Example 2 was modified as shown in FIG. 3. A cation exchange membrane (3) was repalced with a Neosepta ® ACH-45T anion exchange membrane (10). The bipolar membrane (5) was produced from a Neosepta ® CH-45T cation exchange membrane and a Neosepta ® ACH-45T anion exchange membrane, as described in Example 1, paragraph (b). The electrolyte compartments (1) were flushed with 1500 parts of a 5% strength sodium sulfate soltuion. Compartment (9) was charged with 1000 parts of a 1 molar aqueous solution of γ-aminobutyric acid hydrochloride ($HCl.H_2N—(CH_2)_3—COOH$), and compartment (8) was charged with 1000 parts of a 5% strength aqueous sodium chloride solution. Electrodialysis was carried out for 12 hours at room temperature using an initial current density of 3 $A/dm^2$.

An aqeuous solution of γ-aminobutyric acid (0.95 mole/kg, corresponding to a material yield of about 90% and a current efficiency of about 75%) was obtained in compartment (9). The $CL^{\ominus}$ content of this solution was less than 0.1 mole/kg. Compartment (8) contained hydrochloride acid having an HCL content of 0.43 mole/kg.

EXAMPLE 7

Electrodialysis was carried out for 20 hours as described in Example 6, 1000 parts of a 1 molar aqueous tetrabutylammonium bisulfate soltuion being employed in compartment (9), and 1000 parts of a 5% strength aqueous solution of $Na_3PO_4.12\ H_2O$ in compartment (8).

The result was that 994 parts of an aqueous soltuion of tetrabutylammonium hydroxide (0.88 mole/kg) and of bistetrabutylammonium sulfate (0.06 mole/kg) corresponding to a material yield of 88% and a current efficiency of 88%, were obtained in compartment (9). After 10 hours, the solution in compartment (9) consisted virtually entirely of bistetrabutylammonium sulfate.

EXAMPLE 8

Electrodialysis was carried out for 20 hours as described in Example 6, 1000 parts of a 1 molar aqueous solution of triethylammonium acetate being employed in compartment (9), and 1000 parts of a 5% strength aqueous sodium acetate solution being used in compartment (8).

The result was that 807 parts of a 2-phase mixture of triethylamine and water were obtained in compartment (9). The total amount of triethylamine was about 1.1 mole/kg (material yield 89%, current efficiency 62%). Compartment (8) contained 1196 parts of an aqeuous acetic acid solution (0.70 mole/kg, material yield 84%)

The bipolar membrane was tested for a total of 50 hours. After it has been removed, it was found to be uniformly and intimately bonded. If, on the other hand, the prepared membrane (without electrodialysis) has been stored in 5% strength NaCL, adhesive bonding of the membranes would not have resultled.

EXAMPLE 9

A bipolar membrane was produced as described in Example 1, paragraphs (a) and (b), using the cation exchange membrane available commercially (Ionics) under the name Type 61 CZL 386, and the anion exchange membrane available commercially under the name Type 103 QZL 386.

The bipolar membrane prepared in this manner was used for the electrodialysis as described in Example 2, the apparatus being shown in FIG. 2. Electrodialysis was carried out for 10 hours at room temperature and at a current density of 2.9 $A/cm^2$. 200 parts of an aqueous 0.25 molar solution of disodium naphthalene-1,5-disulfonate were used in compartment (9), and 100 parts of 0.5% strength sodium hydroxide solution were employed in compartment (8). 1937 parts of a 0.24 molar solution of monosodium naphthalene-1,5-disulfonate (0.02 mole/kg of the disodium salt, current efficiency 50%) were obtained in compartment (9), and about 1000 parts of 2.2% strength Sodium hydroxide solution were obtained in compartment (8).

When the experiment was complete, the membranes were investigated. It was found that a smooth, bubble-free, strongly bonded bipolar membrane has formed, which could be separated into its individual components.

We claim:

1. In a process for the production of a bipolar membrane by bonding an anion exchange membrane to a cation exchange membrane with the aid of an ion-permeable adhesive in a layer adjoining the two membranes, the improvement which comprises:
    forming the adhesive bonding layer by applying to at least one membrane surface a 0.5–70% strength by weight aqeuous soltuion of a polyvinylamine having a molecular weight of from $10^4$ to $10^6$; and
    subjecting the resulting prepared bipolar membrane to an electrodialysis treatment sufficient to strengthen thea dhesive bonding of the two membranes.

2. A process as claimed in claim 1, wherein the adhesive used in an aqueous polyvinylamine solution obtained by hydrolyzing a 1–50% strength aqeuous polyvinylformamide solution with hydrochloric acid at from 60° to 100° C.

3. A process as claimed in claim 1, wherein in the electrodialysis, the preprepared bipolar membrane is arranged so that the anion exchange membrane faces the anode, and the cation exchange membrane faces the cathode.

4. A process as claimed in claim 1, wherein electrodialysis is carried out at a current density of from 0.1 to 10 A/dm$^2$ and at from 10° to 80° C.

5. A process as claimed in claim 1 wherein the adhesvie bonding layer is formed in a thickness of from 0.001 to 0.5 mm.

6. The bipolar membrane obtained in the process of claim 1.

7. The bipolar membrane obtained in the process of claim 5.

8. A bipolar membrane comprising an anion exchange membrane and a cation exchange membrane joined by an adhesive layer consisting essentially of a polyvinylamine having a molecular weight of from $10^4$ to $10^6$.

9. A bipolar membrane as claimed in claim 8 wherein said adhesvie layer has a thickness of about 0.001 to 0.05 mm.

* * * * *

UNITED STATES PATENT AND TRADEMARK OFFICE
CERTIFICATE OF CORRECTION

PATENT NO. : 4,670,125

DATED : June 2, 1987

INVENTOR(S) : Hans Mueller et al.

Page 1 of 2

It is certified that error appears in the above-identified patent and that said Letters Patent is hereby corrected as shown below:

The sheet of drawings consisting of Figs. 1, 2 and 3 should be added as shown on the attached sheet.

Column 6, Claim 1, line 58, "soltuion" should read -- solution --.

line 62, "thea dhesive" should read -- the adhesive --.

On the title page, "9 Claims, No Drawings" should read -- 9 Claims 3 Drawing Figures --.

Signed and Sealed this

First Day of December, 1987

Attest:

DONALD J. QUIGG

Attesting Officer

Commissioner of Patents and Trademarks